United States Patent
Davis et al.

(10) Patent No.: US 7,946,759 B2
(45) Date of Patent: May 24, 2011

(54) SUBSTRATE TEMPERATURE MEASUREMENT BY INFRARED TRANSMISSION

(75) Inventors: Matthew Fenton Davis, Felton, CA (US); Kenneth J. Bahng, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 328 days.

(21) Appl. No.: 11/676,092

(22) Filed: Feb. 16, 2007

(65) Prior Publication Data

US 2008/0198895 A1   Aug. 21, 2008

(51) Int. Cl.
*G01K 1/02* (2006.01)
*G01J 5/02* (2006.01)
*G01R 31/00* (2006.01)
*H01L 21/02* (2006.01)

(52) U.S. Cl. ............ 374/121; 374/141; 374/131; 374/5; 438/14

(58) Field of Classification Search .......... 374/120–121, 374/125, 130–132, 4, 5, 43, 45, 141; 250/338.1
See application file for complete search history.

(56) References Cited

U.S. PATENT DOCUMENTS

| | | | | |
|---|---|---|---|---|
| 4,543,576 A * | 9/1985 | Hieber et al. | ............ | 340/870.17 |
| 5,071,714 A | 12/1991 | Rodbell et al. | | |
| 5,154,512 A | 10/1992 | Schietinger et al. | | |
| 5,188,979 A | 2/1993 | Filipiak | | |
| 5,217,501 A * | 6/1993 | Fuse et al. | ............ | 29/25.01 |
| 5,337,207 A | 8/1994 | Jones et al. | | |
| 5,356,833 A | 10/1994 | Maniar et al. | | |
| 5,597,237 A * | 1/1997 | Stein | ............ | 374/9 |
| 5,628,564 A * | 5/1997 | Nenyei et al. | ............ | 374/121 |
| 5,641,702 A | 6/1997 | Imai et al. | | |
| 5,840,200 A | 11/1998 | Nakagawa et al. | | |
| 6,107,212 A * | 8/2000 | Fujita | ............ | 438/758 |
| 6,130,415 A * | 10/2000 | Knoot | ............ | 219/502 |
| 6,136,211 A | 10/2000 | Qian et al. | | |
| 6,184,072 B1 | 2/2001 | Kaushik et al. | | |
| 6,204,141 B1 | 3/2001 | Lou | | |
| 6,228,739 B1 | 5/2001 | Ha et al. | | |
| 6,229,118 B1 * | 5/2001 | Kim et al. | ............ | 219/444.1 |
| 6,270,568 B1 | 8/2001 | Droopad et al. | | |
| 6,270,582 B1 * | 8/2001 | Rivkin et al. | ............ | 118/719 |

(Continued)

FOREIGN PATENT DOCUMENTS

JP    08288262 A  * 11/1996

(Continued)

OTHER PUBLICATIONS

Search Report and Written Opinion for PCT/US08/53998, Sep. 4, 2008, consists of 10 unnumbered pages.

(Continued)

*Primary Examiner* — Gail Verbitsky
(74) *Attorney, Agent, or Firm* — Patterson & Sheridan, LLP (57) ABSTRACT

A method and apparatus for measuring a substrate temperature during a thermal process are provided. In one embodiment, an apparatus for measuring a substrate temperature during a thermal process includes an evacuable chamber, a substrate heater positioned to heat a substrate disposed in the chamber, and a sensor positioned to receive energy transmitted through the substrate while the substrate is heated by the substrate heater, wherein the sensor is configured to detect a metric indicative of transmittance. In another embodiment, a method for measuring a substrate temperature includes heating a substrate disposed in a chamber, detecting a change in transmittance of the substrate while heating, and determining a temperature of the substrate based on the change in transmittance.

23 Claims, 6 Drawing Sheets

U.S. PATENT DOCUMENTS

| | | | |
|---|---|---|---|
| 6,297,095 B1 | 10/2001 | Muralidhar et al. | |
| 6,300,202 B1 | 10/2001 | Hobbs et al. | |
| 6,300,212 B1 | 10/2001 | Inoue et al. | |
| 6,319,730 B1 | 11/2001 | Ramdani et al. | |
| 6,326,261 B1 | 12/2001 | Tsang et al. | |
| 6,335,207 B1 | 1/2002 | Joo et al. | |
| 6,338,626 B1* | 1/2002 | Saeki | 432/243 |
| 6,345,909 B1* | 2/2002 | Yam | 374/2 |
| 6,348,386 B1 | 2/2002 | Gilmer | |
| 6,406,179 B2 | 6/2002 | Adams et al. | |
| 6,440,221 B2 | 8/2002 | Shamouilian et al. | |
| 6,479,801 B1* | 11/2002 | Shigeoka et al. | 219/502 |
| 6,486,444 B1 | 11/2002 | Fairbairn et al. | |
| 6,499,777 B1* | 12/2002 | Wang | 294/1.1 |
| 6,513,347 B1* | 2/2003 | Deschamps et al. | 65/29.1 |
| 6,530,687 B1* | 3/2003 | Suzuki et al. | 374/131 |
| 6,641,302 B2* | 11/2003 | Li et al. | 374/130 |
| 6,773,158 B2* | 8/2004 | Koshimizu | 374/117 |
| 6,839,507 B2 | 1/2005 | Adams et al. | |
| 7,226,488 B2* | 6/2007 | Gat | 29/25.01 |
| 7,355,715 B2* | 4/2008 | Suzuki et al. | 356/478 |
| 2001/0055852 A1 | 12/2001 | Moise et al. | |
| 2002/0020696 A1* | 2/2002 | Kitamura et al. | 219/390 |
| 2002/0074312 A1 | 6/2002 | Ou-Yang et al. | |
| 2003/0012255 A1* | 1/2003 | Koshimizu | 374/117 |
| 2003/0170986 A1 | 9/2003 | Nallan et al. | |
| 2004/0002223 A1 | 1/2004 | Nallan et al. | |
| 2004/0004989 A1* | 1/2004 | Shigeoka | 374/121 |
| 2006/0056488 A1* | 3/2006 | Surname et al. | 374/184 |
| 2007/0020784 A1* | 1/2007 | Timans | 438/16 |
| 2008/0099040 A1* | 5/2008 | Bahng et al. | 134/1.3 |
| 2009/0219969 A1* | 9/2009 | Yamamoto | 374/29 |
| 2009/0245320 A1* | 10/2009 | Timans | 374/2 |

FOREIGN PATENT DOCUMENTS

| | | |
|---|---|---|
| WO | WO 01/51072 | 7/2001 |
| WO | WO 01/97257 | 12/2001 |
| WO | WO-2004001840 | 12/2003 |

OTHER PUBLICATIONS

Visokay, et al., Application of HfSiON as a Gate Dielectric Material, Applied Physic. Letters, 80 (17), 3183-85, Mar. 2002.

Yee, et al., Reactive Radio Frequency Sputter Deposition of Higher Nitrides of Titanium, Zirconium and Hafnium, J. Vac. Sci. Technol. A 4(3) May/Jun. 1986, 318-7.

U.S. Appl. No. 11/676,161, filed Feb. 16, 2007 by Bahng, entitled "Integrated Method for Removal of Halogen Residues From Etched Substrates in a Processing System."

Cullen, et al., Temperature Measurement of Metal-Coated Silicon Wafers by Double-Pass Infrared Transmission, IEEE Transactions on Semiconductor Manufacturing, vol. 8, No. 3, Aug. 1995, pp. 346-351.

Baharav, et al., The use of temperature monitoring in advanced semiconductor industry processing, Business Briefing, ASEAN: Semiconductor Manufacturing Technology, 1998, pp. 1-4.

Sturm, et al., Physical Modelling of Non-Invasive Silicon Temperature Measurement by Infrared Absorption, 1991 IEEE, IEDM 91-895, pp. 34.6.1-34.6.4.

Brochure on NTM Delta; CI Semi, printed from internet Dec. 4, 2006.

Brochure on kSA BandiT—Real-time Wafer Temperature Sensing; kSA, printed from internet Dec. 4, 2006.

Brochure on MI-GA5 Sensor; Mikron, printed from internet Dec. 4, 2006.

Official Letter from Korean Patent Office of 10-2008-7024362 dated Dec. 15, 2008.

English translation of Notice of Final Rejection for 10-2008-7024362 dated May 4, 2009.

Official Letter dated Apr. 13, 2010 from Chinese Patent Office for corresponding Chinese Patent application No. 200880000162.8.

* cited by examiner

FIG. 6

SUBSTRATE TEMPERATURE MEASUREMENT BY INFRARED TRANSMISSION

CROSS-REFERENCE TO RELATED APPLICATIONS

This application is related to U.S. patent application Ser. No. 11/676,161 filed Feb. 16, 2007, entitled "Integrated Method for Removal of Halogen Residues From Etched Substrates in a Processing System", by Bahng, et al. Each of the aforementioned related patent applications is herein incorporated by reference in their entireties.

BACKGROUND

1. Field

Aspects of the present invention generally relate to a method and apparatus for measuring a semiconductor substrate temperature. More specifically, aspects of the present invention relate to a method and apparatus for measuring a semiconductor substrate temperature by substrate infrared transmission.

2. Description of the Related Art

Ultra-large-scale integrated (ULSI) circuits may include more than one million electronic devices (e.g., transistors) that are formed on a semiconductor substrate, such as a silicon (Si) substrate, and cooperate to perform various functions within the device. During processing, a number of thermal processing steps are occasionally performed on the substrate surface. Thermal processing typically requires precise substrate temperature measurement for process control. Inaccurate substrate temperature control may result in poor process results that may adversely influence device performance and/or result in substrate film material damage.

Different types of temperature measurement tools may be used to measure substrate temperature during thermal processing. For example, thermocouples are often used to measure a substrate temperature by physically contacting the substrate at predetermined locations on the substrate surface. However, with larger diameter substrates, the overall temperature variation across substrate surface is difficult to determine due to the large distances between measurement locations. Furthermore, the reliability of the thermal physical contact of the thermocouples to the substrate surface is hard to control and has contamination concerns.

Alternatively, optical pyrometry is sometimes used to measure substrate temperature. Radiation emitted from the substrate surface during thermal processing is measured by an optical pyrometry sensor to determine the substrate temperature. However, the measurement of optical emissions from substrate surface is difficult to separate from background noise, such as intense lighting from heating lamps, optical emissions from chamber wall and/or stray light from windows. As the optical emissions from the substrate surface may not be accurately measured and the background noise may further introduce error to temperature measurement, the actual substrate surface temperature is difficult to precisely measure, which may result in erroneous substrate temperature determination and consequently poor processing results.

Therefore, there is a need for an improved method and apparatus for substrate temperature measurement during thermal processing.

SUMMARY

A method and apparatus for measuring a substrate temperature during a thermal process are provided. In one embodiment, an apparatus for measuring a substrate temperature during a thermal process includes an evacutable chamber, a substrate heater positioned to heat a substrate disposed in the chamber, and a sensor positioned to receive energy transmitted through the substrate while the substrate is heated, wherein the sensor is configured to detect a metric indicative of transmittance.

In another embodiment, a method for measuring a substrate temperature includes heating a substrate disposed in a chamber, detecting a change in transmittance of the substrate while heating, and determining a temperature of the substrate based on the change in transmittance.

In yet another embodiment, a method for measuring a substrate temperature includes treating a substrate processed in a presence of a halogen containing element, transferring the substrate onto a pedestal disposed in an evacutable chamber having a lamp assembly, heating the substrate with an infrared light provided by the lamp assembly, detecting infrared light transmitting through the substrate, and calculating a substrate temperature based on the detected light.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Embodiments of the present invention provide a method and apparatus for measuring a substrate temperature during a thermal process. In one embodiment, the substrate temperature may be determined by monitoring changes in the transmittance of energy through a substrate.

Figure 1:
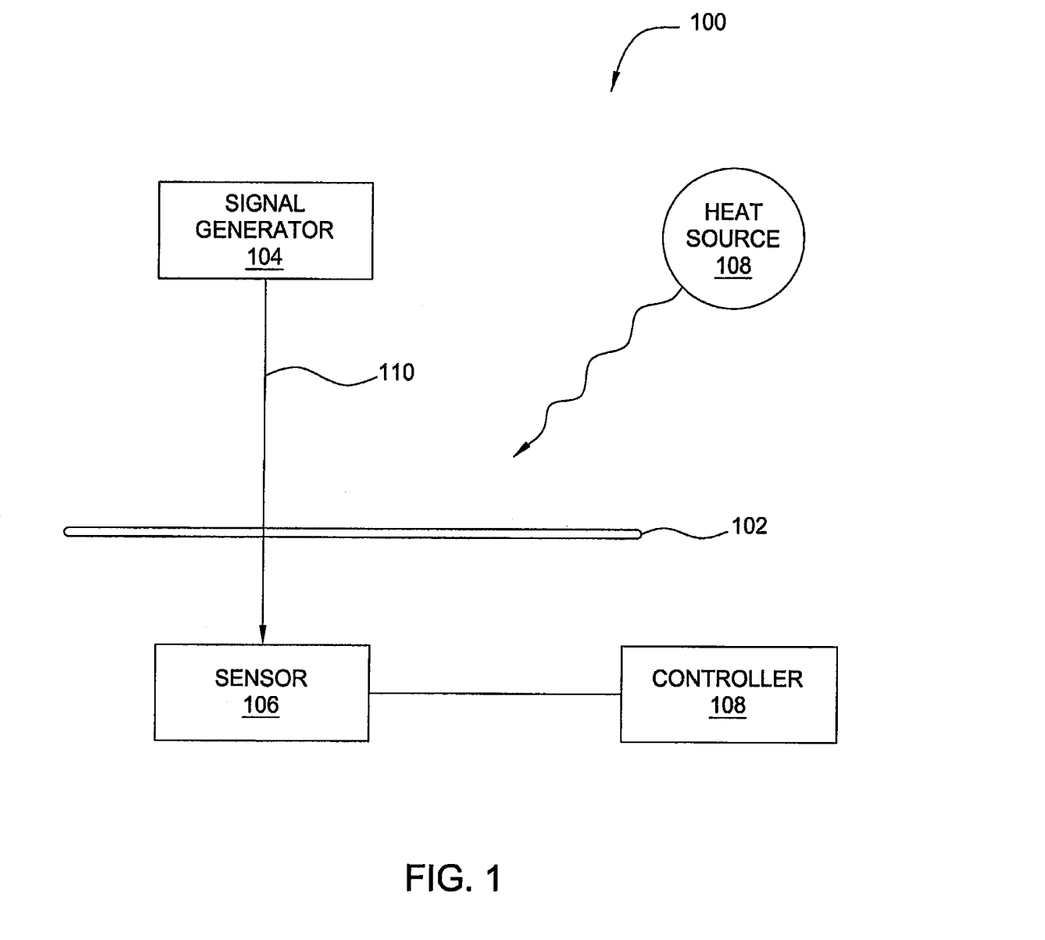
FIG. 1 depicts a simplified schematic diagram of an exemplary processing apparatus suitable for practice the present invention.

FIG. 1 depicts a simplified schematic diagram of a processing apparatus suitable for practice the present invention. The simplified processing apparatus 100 is operated under vacuum. The apparatus 100 includes a heat source 108 adapted to provide thermal energy to a substrate 102 disposed in the apparatus 100. In one embodiment, the heat source is a heating module, such as a lamp assembly. The heat source 108 may alternatively be a heated substrate holder, a heated support pedestal, a resistive heater or other heat source suitable for raising the temperature of the substrate. A signal generator 104 and sensor 106 are disposed on opposite sides of the substrate 102. The signal generator 104 is disposed above the substrate 102 adapted to generate a signal 110 that is transmitted through the substrate 102. A sensor 106 is positioned to receive the signal 110 passing through the substrate 102 from the signal generator 110. A controller 112 is connected to the sensor 106 to analyze the signal received from the generator 104. The signal generator 104 may be any energy source providing energy at a wavelength transmittance to the substrate, and may include lasers and broad band light sources. In one embodiment, the signal generator 104 and heat source 108 are a single device, such as a heating lamp.

Different substrate materials may have different transmittance of light at different temperatures and different wavelengths. As the heat source 108 provides thermal energy to the substrate surface, the substrate temperature changes. A portion of the signal 110 is transmitted through the substrate 102 while another portion is absorbed. The amount of the signal transmitted through the substrate 102 is dependent on the temperature of the substrate 102. Thus, as the substrate 102 is heated, the amount of the signal 110 transmitted through the substrate 102 changes. The sensor 106 detects the changes in the signal 110. Based on the change of the detected signal 110, the substrate temperature may be determined accordingly.

In one embodiment, the signal generator 104 may be a light generator having different wavelengths. For example, the signal generator 104 may provide a laser beam having a narrow band of wavelengths centered in the range between about 1150 nm and about 1250 nm adapted to generate a signal to transmit through the substrate 102 to the sensor 106. In another embodiment, the signal generator 104 may provide a light energy having a wavelength between about 1100 nm and about 1300 nm. In another embodiment, the signal generator 104 may be configured as the heat source 108 adapted to provide a light energy to heat the substrate 102 and transmit the light energy through the substrate 102 to the sensor 106. For example, the signal generator 104 may be a heat module, such as a lamp assembly, producing high power in a wavelength range between about 400 nm and 14000 nm providing infrared (IR) to heat and transmit though the substrate 102.

Figure 2:
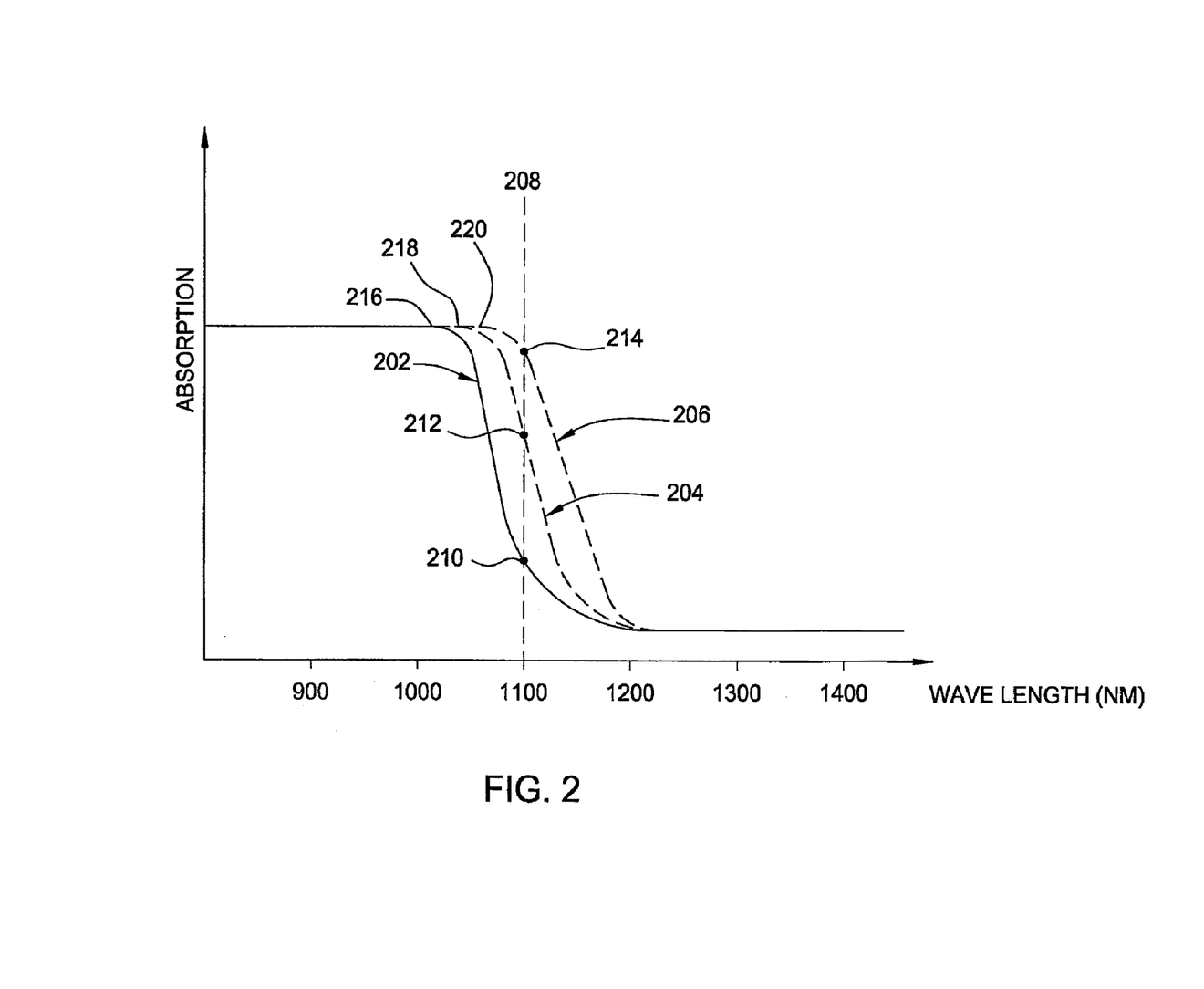
FIG. 2 depicts a graph illustrating silicon substrate absorption verses IR light wavelength at different substrate temperatures.

FIG. 2 depicts light absorption behavior of a substrate using a silicon as substrate material at different substrate temperatures and at different wavelengths. The absorption trace lines 202, 204, 206 depict the absorption of silicon semiconductor material as a function of wavelength at different temperatures. The traces indicate that absorption may be correlated to substrate temperature. As the substrate temperature increases, the change in slope 216, 218, 220 of each absorption trace line 202, 204, 206 begins at a longer wavelength. Thus, for each wavelength, the substrate has a range of temperatures over which a change in absorption is rapid. Therefore, to ensure good resolution when determining a temperature of interest, a wavelength is selected for which the substrate has a rapid change in absorption over a range of temperatures that includes the temperature of interest. For example, at a given light wavelength, such as a wavelength 208 of about 1100 nm, increasing the temperature of the substrate temperature causes the amount of absorption of silicon substrate change rapidly between a first point 210 of trace line 202 toward a second point 212 to a third point 214 due to heating from the IR light from the heater module as the absorption of the light by the substrate increases. Thus, less light is transmitted through the silicon substrate as it heats which can be utilized, by measuring the change in transmittance, to resolve the temperature.

Figure 3:
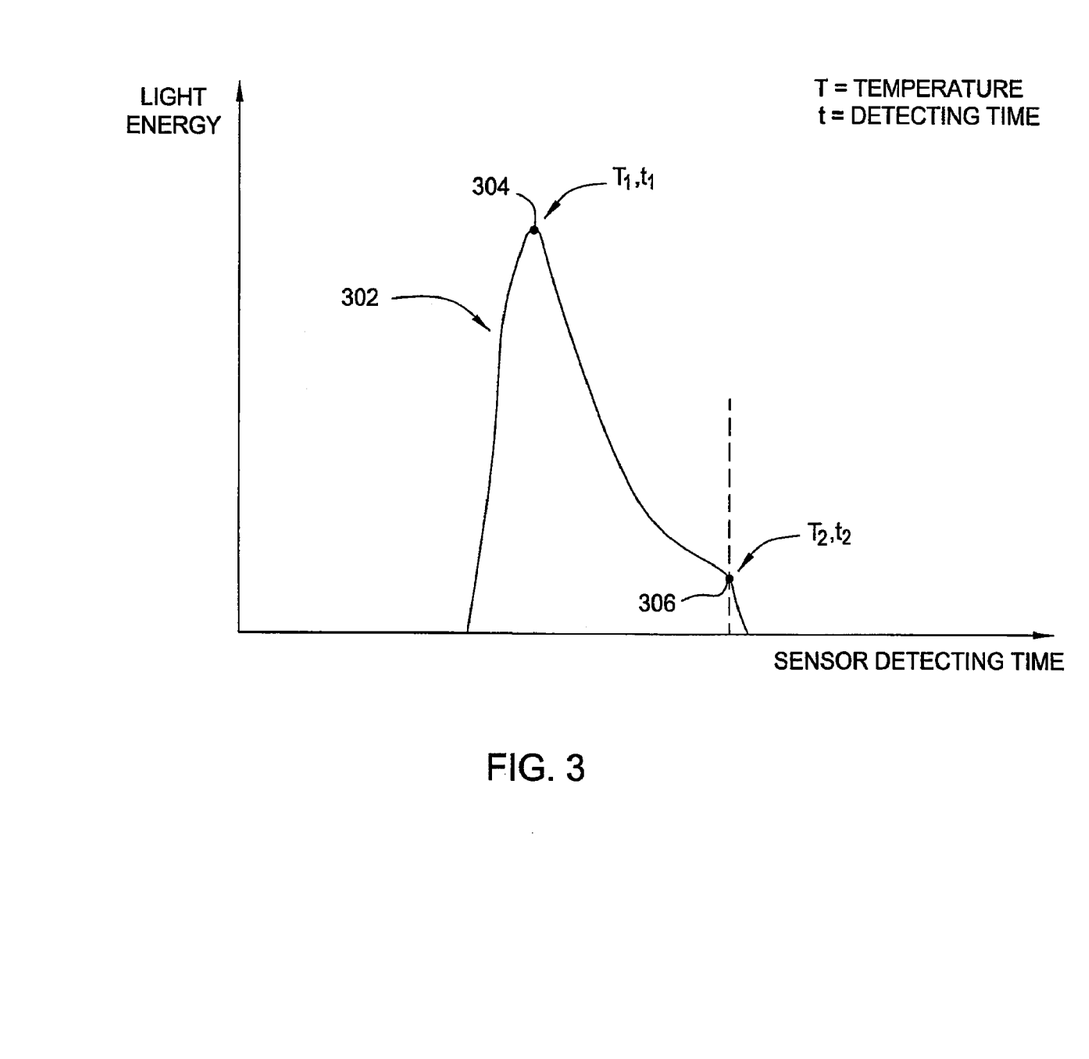
FIG. 3 depicts a graph illustrating transmitted energy verses time.

FIG. 3 depicts a trace 302 of IR light energy transmitted through the substrate 102 as a function of substrate temperature. The energy trace 302 represents the change in light energy transmitted through the substrate 102 as the temperature of the substrate increases. The substrate entering the apparatus 100 may have a low temperature T1 with high transmittance. Accordingly, substantial amount of light energy from the heater source 108 and/or or the signal generator 104 is transmitted through the substrate 102 to the sensor 106. As shown at point 304 on the trace 302, the sensor 106 indicates a high energy transmittance at an initial detecting time t1 at a low temperature T1. As the IR light is supplied to the substrate 102 at a constant level, the temperature of the substrate elevates. As the substrate temperature increases to a higher temperature T2, the change in the transmittance through silicon substrate decreases as the hotter substrate absorbs more IR light, resulting in a reduction of the transmitted IR energy. As shown at point 306 at time t2, the light energy detected by the sensor 106 is low due to the high absorption at high substrate temperature T2.

Figure 4:
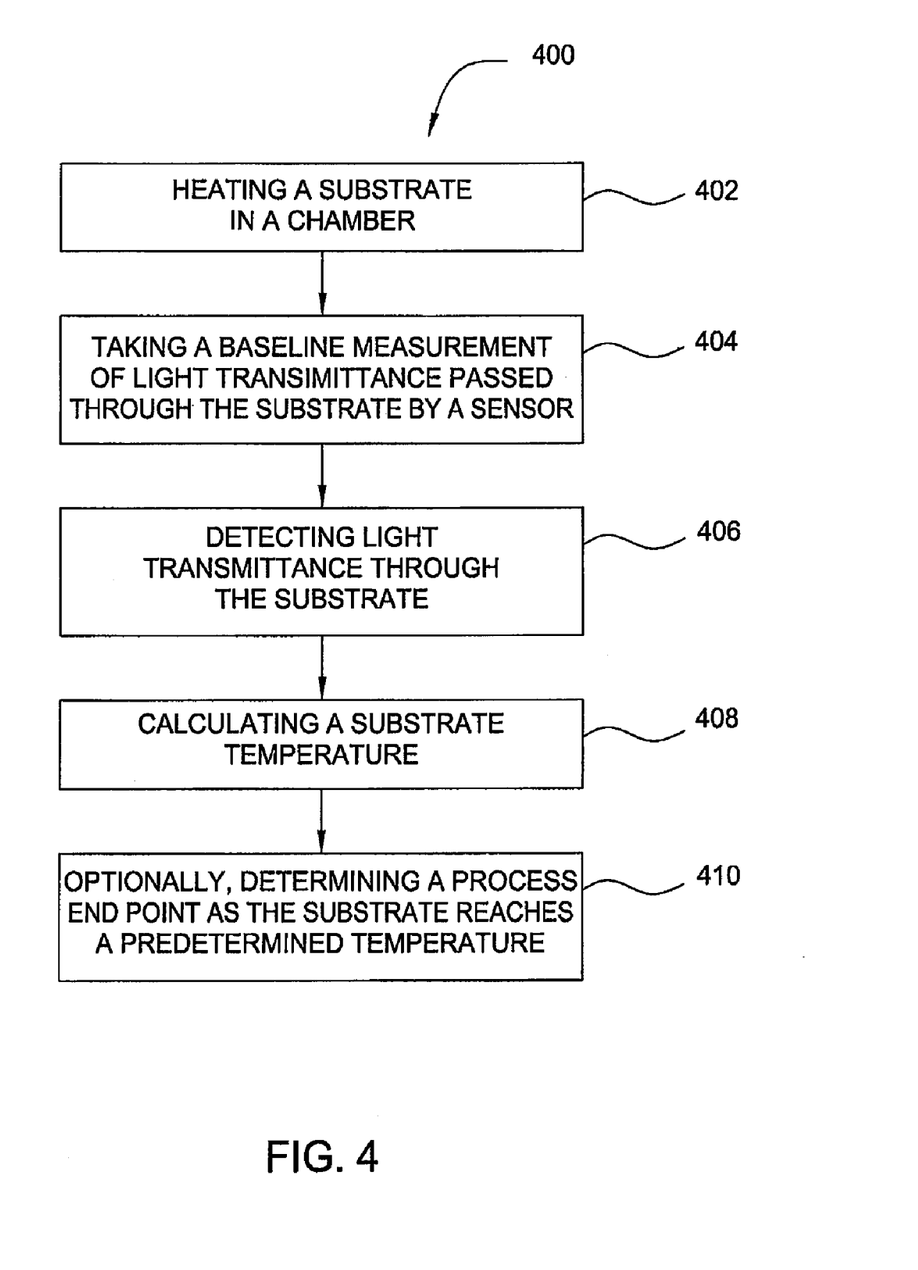
FIG. 4 depicts a process diagram illustrating a method for measuring a substrate temperature according to one embodiment of the present invention.

FIG. 4 depicts a flow diagram of a method 400 for measuring a substrate temperature during a thermal process in accordance with one embodiment of the present invention. The method 400 is configured to be performed with the processing apparatus 100 as described in FIG. 1, or other suitably equipped region of a processing system, as further discussed below with reference to FIGS. 4-5. It is contemplated that the method 400 may be performed in other suitably equipped processing systems, including those from other manufacturers.

The method 400 begins at step 402 by heating a substrate by a heater module in a chamber. At step 404, a sensor is used to take a baseline measurement of light transmittance transmitted through the substrate to the sensor just as the heater module reaches a stead state output condition. At step 406, the sensor consecutively detects and analyzes light transmittance transmitted through the substrate during the heating process. At step 408, the measured fractional light transmittance transmitted through the substrate is used to calculate the temperature of the substrate. The substrate temperature corresponds to a change in light transmittance relative to the baseline initially detected by the sensor. At an optional step 410, a process endpoint of the substrate is determined as the substrate reaches a predetermined temperature as resolved by the sensor.

Figure 5:
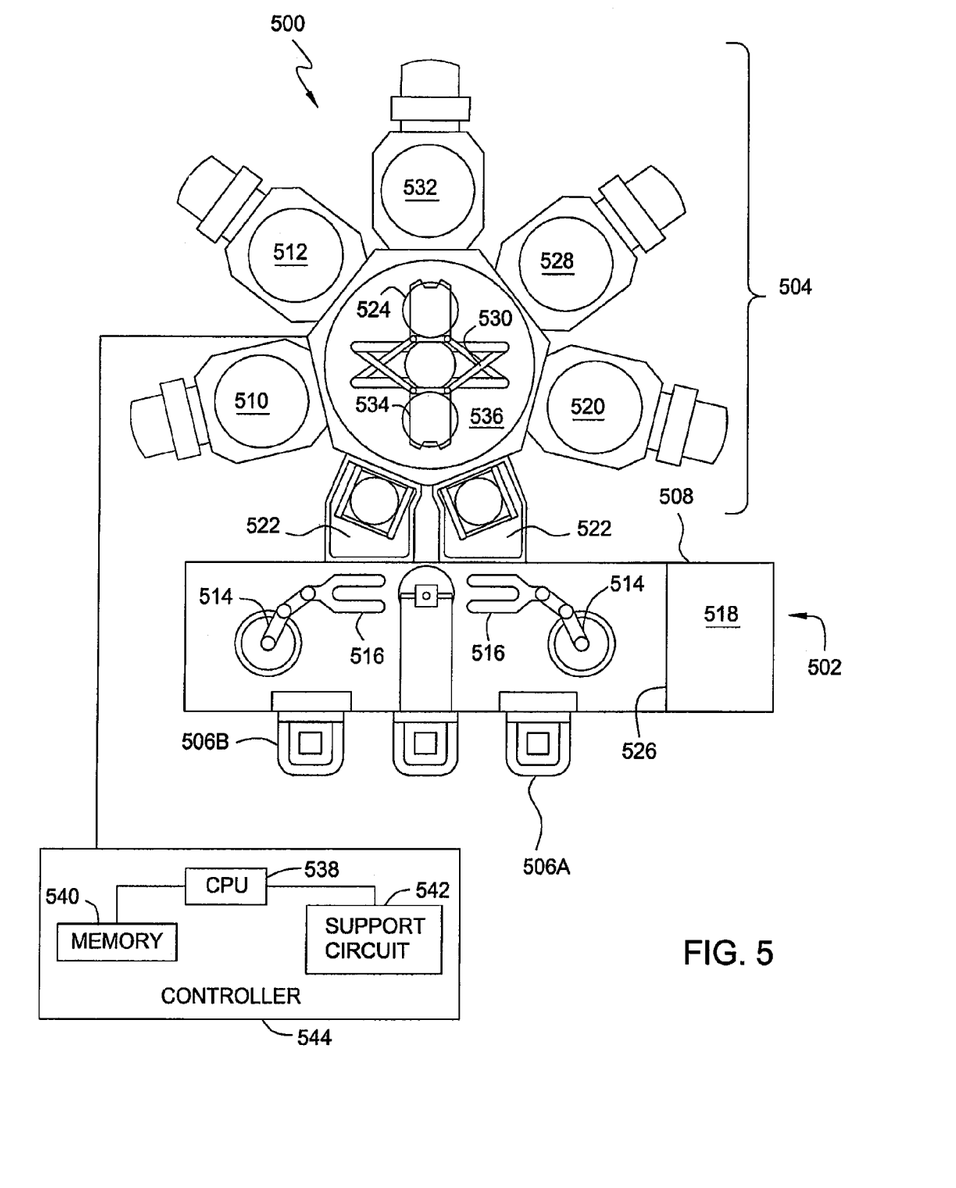
FIG. 5 depicts a schematic diagram of an exemplary processing apparatus configured to practice the present invention.

FIG. 5 is a schematic, top plan view of an exemplary processing system 500 that includes at least one region configured to include the apparatus 100 as depicted in FIG. 1 for performing a thermal process 400 of the present invention. In one embodiment, the processing system 500 may be a suitably adapted CENTURA® integrated processing system, commercially available from Applied Materials, Inc., located in Santa Clara, Calif. It is contemplated that other processing systems (including those from other manufacturers) may be adapted to benefit from the invention.

The system 500 includes a vacuum-tight processing platform 504, a factory interface 502, and a system controller 544. The platform 504 includes a plurality of processing chambers 510, 512, 532, 528, 520 and at least one load-lock chamber 522 that are coupled to a vacuum substrate transfer chamber 536. Two load lock chambers 522 are shown in FIG. 5. The factory interface 502 is coupled to the transfer chamber 536 by the load lock chambers 522.

In one embodiment, the factory interface 502 comprises at least one docking station 508 and at least one factory interface robot 514 to facilitate transfer of substrates. The docking station 508 is configured to accept one or more front opening unified pod (FOUP). Two FOUPS 506A-B are shown in the embodiment of FIG. 5. The factory interface robot 514 having a blade 516 disposed on one end of the robot 514 is configured to transfer the substrate from the factory interface 502 to the load lock chambers 522 of the processing platform 504. Optionally, one or more metrology stations 518 may be connected to a terminal 526 of the factory interface 502 to facilitate measurement of substrates while within the factory interface 502.

Each of the load lock chambers 522 have a first port coupled to the factory interface 502 and a second port coupled to the transfer chamber 536. The load lock chambers 522 are coupled to a pressure control system (not shown) which pumps down and vents the load lock chambers 522 to facilitate passing the substrate between the vacuum environment of the transfer chamber 536 and the substantially ambient (e.g., atmospheric) environment of the factory interface 502.

The transfer chamber 536 has a vacuum robot 530 disposed therein. The vacuum robot 530 has a blade 534 capable of transferring substrates 524 between the load lock chambers 522 and the processing chambers 510, 512, 532, 528, 520.

In one embodiment, at least one process chambers 510, 512, 532, 528, 520 is an etch chamber. For example, the etch chamber may be a Decoupled Plasma Source (DPS) chamber available from Applied Materials, Inc. The DPS etch chamber uses an inductive source to produce high-density plasma and comprises a source of radio-frequency (RF) power to bias the substrate. Alternatively, at least one of the process chambers 510, 512, 532, 528, 520 may be one of a HART™, E-MAX®, DPS®, DPS II, PRODUCER E, or ENABLER® etch chamber also available from Applied Materials, Inc., or another chamber, including those from other manufacturers. The etch chamber, for example, the chamber 510 may use a halogen-containing gas to etch the substrate 524 disposed therein. Examples of halogen-containing gas include hydrogen bromide (HBr), chlorine ($Cl_2$), carbon tetrafluoride ($CF_4$), and the like. After etching the substrate 524, halogen-containing residues may be left on the substrate surface. The halogen-containing residues may be removed by a thermal treatment process. The thermal treatment process may be performed in-situ the system 500, such as in one of the processing chambers 510, 512, 532, 528, and 520 that are equipped with energy generator, such as an infrared (IR) lamp assembly. A sensor is used to monitor the substrate during the thermal treatment process which is correlated to substrate temperature. Alternatively, the thermal treatment process may be performed in another region of the system 500, such as transfer chamber 536, load lock chambers 522, metrology stations 518, or factory interface 502 equipped with an energy generator and transmittance sensor. In an exemplary embodiment, the thermal treatment process is performed in the load lock chamber 522, or alternatively be performed in a suitably equipped region of the system 500.

The system controller 544 is coupled to the processing system 500. The system controller 544 controls the operation of the system 500 using a direct control of the process chambers 510, 512, 532, 528, 520 of the system 500 or alternatively, by controlling the computers (or controllers) associated with the process chambers 510, 512, 532, 528, 520 and the system 500. In operation, the system controller 544 enables data collection and feedback from the respective chambers and system controller 544 to optimize performance of the system 500.

The system controller 544 generally includes a central processing unit (CPU) 538, a memory 540, and support circuit 542. The CPU 538 may be one of any form of a general purpose computer processor that can be used in an industrial setting. The support circuits 542 are conventionally coupled to the CPU 138 and may comprise cache, clock circuits, input/output subsystems, power supplies, and the like. The software routines, such as the method 400 for removing halogen-containing residues as described in FIG. 4, when executed by the CPU 538, transform the CPU 538 into a specific purpose computer (controller) 544. The software routines may also be stored and/or executed by a second controller (not shown) that is located remotely from the system 500.

Figure 6:
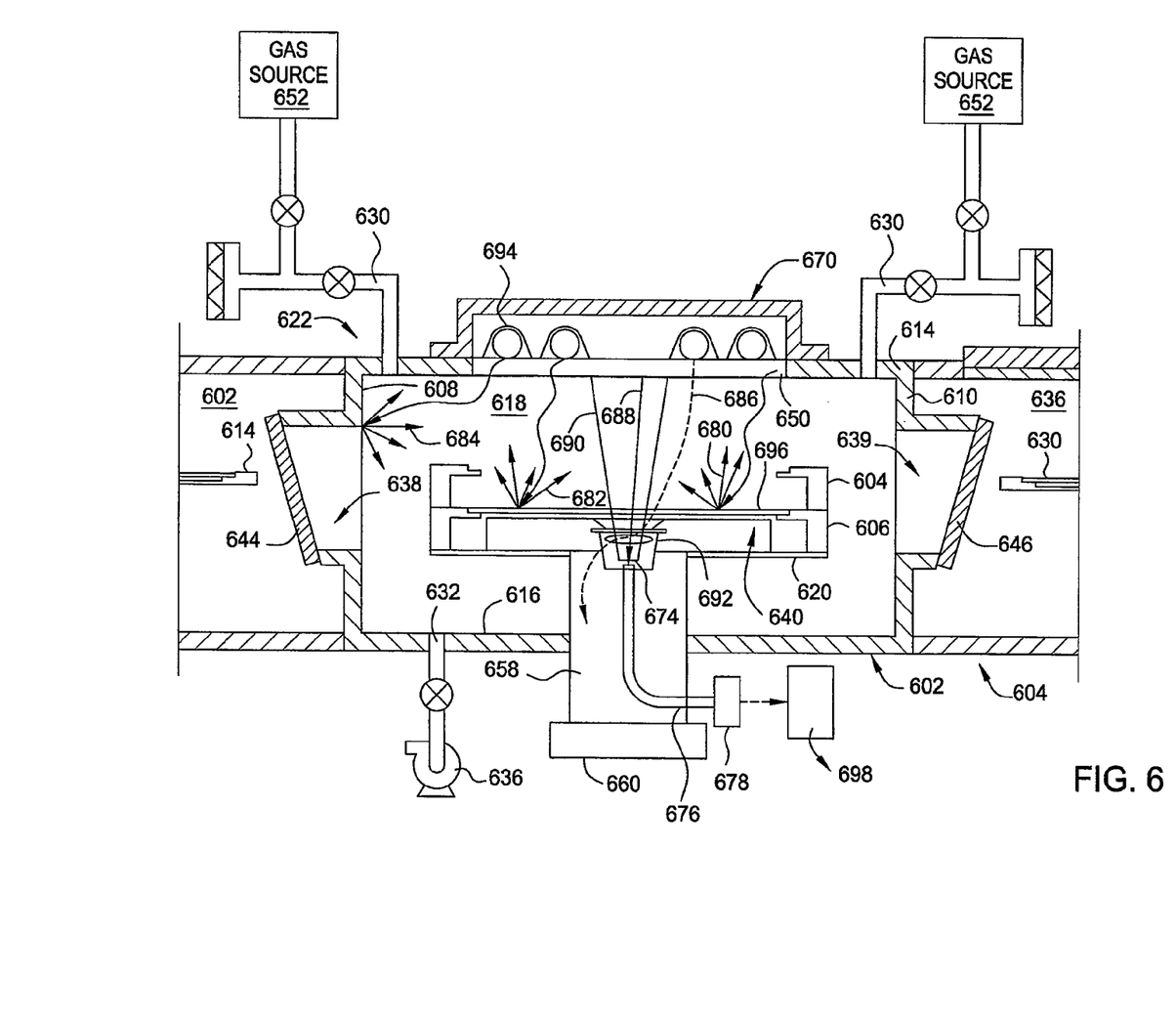
FIG. 6 depicts a sectional view of the load lock chamber of FIG. 5.

FIG. 6 depicts one embodiment of the load lock chamber 522 utilized to perform a thermal process on a substrate. The load lock chamber 522 generally includes a chamber body 602, a first substrate holder 604, a second substrate holder 606, a temperature control pedestal 640 and an energy source, such as a heater module 670. A sensor 698 is disposed within the temperature control pedestal 640. The chamber body 602 may be fabricated from a singular body of material, such as aluminum. The chamber body 602 includes a first side wall 608, a second side wall 610, a top 614 and a bottom 616 that define a chamber volume 618. A window 650, typically comprised of quartz, is disposed in the top 614 of the chamber body 602 and is at least partially covered by the heater module 670. In one embodiment, a plurality of lamps 694 is disposed in the heater module 670 to generate heat for substrate thermal processing. In one embodiment, the lamps 694 are infrared lamps providing infrared radiation having a wavelength between about 1000 nm and about 1300 nm, such as between about 1050 nm and about 1200 nm, for example, between about 1100 nm and about 1150 nm. The infrared radiation generated from the lamps 694 may provide heat to the substrate and increase the substrate temperature up to about 500 degrees Celsius. Generally, the wavelength of the lamp 694 is selected to have a high change in transmittance through the materials and/or films being heated in the range of temperature for which measurement is sought, for example, a temperature of a thermal process endpoint.

In one embodiment, the sensor 698 is an InGaAs diode sensor adapted to measure a substrate temperature range between about 150 degrees Celsius and about 350 degrees Celsius. The sensor 698 is optically aligned with an optical collimator 692 and a filter 678. The optical collimator 692 is disposed in the pedestal 640 between an end 674 of an optical conduit 676 (i.e., an optical fiber) and the substrate 696. The optical conduit 676 detects collected energy passing through substrate 696 and collimator 692 to the filter 678. The filter 678 is adapted to filter the signal collected from the optical collimator 692 and only provides IR light with a desired wavelength to the sensor 698.

In one embodiment, the optical collimator 692 has an aperture selected to allow energy to enter the optical conduit 676 having an angle 690, thus excluding scattered energy and other noise. For example, the selected angle 690 of the optical collimator 692 only allows light 688 passing through the substrate at the angle 690 to be collected, and prevents light 686 incident at angles outside of the selected angle 690 from entering into the optical conduit 676. The unwanted reflected light from the chamber wall 684 and/or noise generated from the background 682, 680 may be prevented from interfering the signal entering to optical conduit 676 through the collimator 692 and ultimately reaching the sensor 698 through the filter 678. The light energy reaching to the sensor 698 is then further analyzed to calculate the temperature of the substrate 698.

The pressure of the chamber volume 618 may be controlled so that the load lock chamber 522 may be evacuated to substantially match the environment of the transfer chamber 536 and be vented to substantially match the environment of the factory interface 502. The chamber body 602 includes one or more vent passages 630 and a pump passage 632 to provide laminar flow within the chamber volume 618 during venting and evacuation to minimize particulate contamination. The vent passage 630 may be additionally coupled to a gas source 652 to provide a gas mixture into the chamber volume 618. Examples of gases that may be supplied from the gas source 652 include nitrogen ($N_2$), argon (Ar), hydrogen ($H_2$), alkanes, alkenes, helium (He), oxygen ($O_2$), ozone ($O_3$), water vapor ($H_2O$), and the like. The pump passage 632 is coupled to a pump 636 to pump-down the gases and control the pressure of the load lock chamber 522 at a desired point.

A first loading port 638 is disposed in the first wall 608 of the chamber body 602 to allow the substrate 524 to be transferred between the load lock chamber 522 and the factory interface 502. A first slit valve 644 selectively seals the first loading port 638 to isolate the load lock chamber 522 from the factory interface 502. A second loading port 639 is disposed in the second wall 610 of the chamber body 602 to allow the substrate 524 to be transferred between the load lock chamber 522 and the transfer chamber 536. A second slit valve 646 which is substantially similar to the first slit valve 644 selectively seals the second loading port 639 to isolate the load lock chamber 522 from the vacuum environment of the transfer chamber 536.

The first substrate holder 604 is concentrically coupled to (i.e., stacked on top of) the second substrate holder 606 that is disposed above the chamber bottom 616. The substrate holders 604, 606 are generally mounted to a hoop 620 that is coupled to a shaft 658 that extends through the bottom 616 of the chamber body 602. Each substrate holder 604, 606 is configured to retain one substrate. The shaft 658 is coupled to a lift mechanism 660 disposed exterior to the load lock chamber 522 that controls the elevation of the substrate holders 604 and 606 within the chamber body 602. The first substrate holder 604 is utilized to hold an unprocessed substrate from the factory interface 502 while the second substrate holder 606 is utilized to hold a processed substrate (e.g., an etched substrate) returning from the transfer chamber 536. In embodiment depicted in FIG. 6, a processed substrate 696 is positioned on the second substrate holder 606 after processing at any one of the processing chamber, 510, 512, 532, 528 and 520.

Referring back to FIG. 4, the method 400 may be practiced by providing a substrate into a chamber having a heater module, such as the load lock chamber 522 as depicted in FIG. 5. In one embodiment, the substrate may be any substrate or material adapted to perform a thermal process. In one embodiment, the substrate may be a silicon semiconductor substrate having a layer or layers formed thereon utilized to form a structure, such as a gate structure. The substrate may alternatively utilize a mask layer as an etch mask and/or etch stop layer disposed on the substrate to promote the transfer of the features or structures to the substrate. In another embodiment, the substrate a silicon semiconductor substrate having multiple layers, e.g., a film stack, utilized to form different patterns and/or features, such as dual damascene structure and the like. The substrate may be a material such as crystalline silicon (e.g., Si<100> or Si<111>), silicon oxide, strained silicon, silicon germanium, doped or undoped polysilicon, doped or undoped silicon wafers and patterned or non-patterned wafers silicon on insulator (SOI), carbon doped silicon oxides, silicon nitride, doped silicon, germanium, gallium arsenide, glass, sapphire, metal layers disposed on silicon and the like. The substrate may have various dimensions, such as 200 mm or 300 mm diameter wafers, as well as, rectangular or square panels. In embodiment depicted in the present invention, the substrate may be a silicon semiconductor substrate.

In one embodiment, the substrate transferred to the load lock chamber 522 may be previously etched in one of the processing chambers 510, 512, 532, 528, 520 by supplying a gas mixture having at least a halogen-containing gas. Suitable examples of halogen-containing gas include, but not limited to, hydrogen bromide (HBr), chlorine ($Cl_2$), carbon tetrafluoride ($CF_4$), and the like. During etching, the processed materials on the substrate may combine with the components of the etchant chemistry, as well as with the components of the mask layers, if any, and by-products of the etch process, thereby forming halogen-containing residues on the substrate surface. The thermal process as provided by the load lock chamber 522 may heat the halogen-containing residues and form volatile compounds evaporated from the substrate surface, thereby promoting removal of the halogen-containing residues from the substrate surface.

In one embodiment, the substrate 102 transferred into the load lock chamber 522 to perform the thermal process may have a temperature between about 80 degrees Celsius and about 120 degrees. In another embodiment, the substrate 102 transferred into the load lock chamber 522 may have a temperature about lower than 80 degrees Celsius. In yet another embodiment, the substrate 102 transferred into the load lock chamber 522 may have a temperature as the process temperature previously performed thereon.

At step 402, the energy source, such as the lamp assembly 670, is turned on to heat the substrate surface. Referring additionally to FIG. 6, as the substrate 102 is transferred into the load lock chamber 522 from the transfer chamber 536, and slit valve 646 is subsequently closed after the completion of the transfer. Once the slit valve 646 is closed and the substrate 102 is positioned on the second holder 606, the heater module 670 is turned on to perform the thermal process to the substrate 100. The lamps 694 of the heater module 670 generate infrared light that heats the substrate surface. In one embodiment, the lamps 694 generate infrared light at wavelengths between about 400 nm and about 14000 nm, with very high intensity at the measurement wavelength of 1200 nm.

In one embodiment, a gas mixture may be supplied from the gas source 652 to the load lock chamber 522 during heating of the etched substrate. The processed substrate 100 is exposed to and reacts with the gas mixture. In an exemplary embodiment where the halogen containing residue is present on the processed substrate surface, the gas mixture converts the outgassed halogen-based reactants into non-corrosive volatile compounds that are pumped out of the load lock chamber 522. The gas mixture may include an oxygen-containing gas, such as $O_2$, $O_3$, water vapor ($H_2O$), a hydrogen-containing gas, such as $H_2$, forming gas, water vapor ($H_2O$), alkanes, alkenes, and the like, or an inert gas, such as a nitrogen gas ($N_2$), argon (Ar), helium (He), and the like. For example, the gas mixture may include oxygen, nitrogen, and a hydrogen-containing gas. In one embodiment, the hydrogen-containing gas is at least one of hydrogen ($H_2$) and water vapor ($H_2O$). In embodiments which mask layers is present on the substrate, the mask layers may be simultaneously removed with the halogen-containing residues, e.g., the mask is stripped of the photoresist in the load lock chamber.

At step 404, the sensor 698 is used to detect the IR light from the heat module 670 transmitted through the substrate 102 after the lamp assembly 670 has reached a steady state output establishing a baseline transmittance reading. The sensor 698 is used after the output from the heater module 670 has been stabilized. In one embodiment, the heat output is stabilized after between about 2 second and about 5 seconds. The delay time for the sensor 698 provides two benefits. First, the output of the heater module 670 is allowed so that a constant amount of energy is provided to the substrate while sensing the transmittance. Secondly, the substrate is allowed to heat into a temperature range in which the absorption changes rapidly, thereby providing good resolution for measurement.

As previously discussed, the absorption of the substrate at different substrate temperatures significantly influences the amount of light energy passed through the substrate 696 and further to the sensor 698. As the substrate temperature elevates, the amount of light energy passed through the substrate 102 varies, thereby causing a change of the amount of the light energy transmitted to the sensor 698. Accordingly, the sensor 698 provides a metric indicative of the change in absorption at step 406 during this period which may be utilized to determine the substrate temperature at step 408.

At step 408, the substrate temperature is resolved. The wavelength is selected such that the substrate temperature and the silicon substrate absorption have a linear inverse ratio over the range of interest such that the substrate temperature may be calculated by measuring change in IR light transmittance through the substrate. The sensor 698 provides two metrics of IR transmittance which are expressed as a ratio that correlates to the substrate temperature. Table 1 depicts an exemplary embodiment of relationship of the substrate temperature and the transmittance ratio. In the exemplary embodiment, a ratio of about 1 correlates to a substrate temperature of about 70 degrees Celsius to 120 degree Celsius. With the increasing of the substrate temperature, the substrate IR transmittance drops and IR light energy passed to the sensor 698 decreases accordingly. As the sensor 698 records a gradually diminished IR energy, the transmittance ratio decreases. Based on the gradual change of the substrate JR transmittance detected by the sensor 698, the substrate temperature may be calculated accordingly. As such, the substrate temperature during the thermal processing is accurately measured and calculated by measuring the substrate IR transmittance utilized the silicon materials' intrinsic property, such as the change in energy absorption as a function of different temperature. It is contemplated that the relationship between the transmittance ratio and temperature may be calculated or be obtained empirically.

TABLE 1

The relationship of the detected ratio and the substrate temperature for 1200 nm with a bandwidth of 10 nm

| Ratio | Substrate Temperature (Unit: Degrees Celsius) |
|---|---|
| 1.0000 | 70.0000 |
| 1.0000 | 100.0000 |
| 1.0000 | 120.0000 |
| 0.9850 | 123.7164 |
| 0.9700 | 127.4328 |
| 0.9320 | 136.7239 |
| 0.8950 | 146.0149 |
| 0.8580 | 155.3060 |
| 0.8200 | 164.5970 |

TABLE 1-continued

The relationship of the detected ratio and the substrate temperature for 1200 nm with a bandwidth of 10 nm

| Ratio | Substrate Temperature (Unit: Degrees Celsius) |
|---|---|
| 0.7680 | 177.6045 |
| 0.7310 | 186.8955 |
| 0.6710 | 201.7612 |
| 0.6110 | 216.6269 |
| 0.5520 | 231.4925 |
| 0.5070 | 242.6418 |
| 0.4470 | 257.5075 |
| 0.3880 | 272.3731 |
| 0.3420 | 283.5224 |
| 0.2980 | 294.6716 |
| 0.1000 | 350.0000 |

In one embodiment, as the thermal process is performed on the substrate surface, the heat causes the temperature of the surface of the substrate to rise, thereby causing halogen-based reactants, if any, disposed on the processed substrate surface to be released and/or outgassed. The rapid heating of the substrate by heater module 670 allows the halogen-containing residues on the processed substrate to be removed without increasing process cycle time which would be encountered if the residues were removed in one if the processing chambers.

Optionally, at step 410, an end point for turning off the heat module 670 is determined when the substrate has reached a desired substrate temperature. The endpoint temperature may be resolved using the transmittance ratio. As the calculated ratio indicates the substrate temperature has reached to a desired temperature, the sensor 698 sends a signal to the controller 544, thereby shutting off the heater module 670.

In one embodiment, the heater module 670 may be turned off as the substrate temperature has reached to between about 250 degrees Celsius and about 400 degrees Celsius. In another embodiment, the heater module 670 may be turned off by a predetermined time calculated by the sensor 698. The predetermined time period may be ranged between about 5 seconds and about 180 seconds, and will depend on the heat generating capacity of the module 670. In yet another embodiment where the halogen containing residual is present on the substrate surface, the heater module 670 is turned off at a predetermined time period when the halogen-containing residues on the processed substrate are removed from the substrate surface. The endpoint time period for removing halogen containing residual may be between about 10 seconds to about 120 seconds, such as between about 30 seconds to about 90 seconds. Alternatively, a residual gas analyzer (RGA) may also be utilized to detect the remaining halogen-containing residues on the etched substrate surface.

Thus, the present invention provides a method and apparatus for measuring a substrate temperature during a thermal process. The method and apparatus advantageously monitors the actual substrate temperature by a sensor during the thermal process by measuring the IR transmittance transmitted through the substrate. The opacity of the substrate at different temperature provides different amount of IR transmittance passing through the substrate, thereby assisting the sensor to determine the actual substrate temperature.

While the foregoing is directed to embodiments of the present invention, other and further embodiments of the invention may be devised without departing from the basic scope thereof, and the scope thereof is determined by the claims that follow.

The invention claimed is:

1. An apparatus for measuring a substrate temperature during a thermal process, comprising:
   an evacutable load lock chamber;
   a substrate heater positioned to heat a substrate disposed in the chamber; and
   a signal generator disposed in the chamber and operable to emit a signal having a predetermined wavelength;
   a transmittance sensor positioned to receive a portion of the signal transmitted through the substrate from the signal generator while the substrate is heated by the substrate heater, wherein the transmittance sensor is configured to detect a metric indicative of transmittance.

2. The apparatus of claim 1, wherein the substrate heater is a lamp or plurality of lamps.

3. The apparatus of claim 1, wherein the substrate heater is a heated robot blade configured to transfer the substrate into or out of the load lock chamber.

4. The apparatus of claim 1, wherein the substrate heater is a substrate support disposed in the load lock chamber.

5. The apparatus of claim 1, further comprising:
   an optical collimator disposed between the substrate and the transmittance sensor.

6. The apparatus of claim 5, further comprising:
   an optical conduit, wherein the optical collimator is positioned to collect energy incidence at a predefined angle on the substrate into the optical conduit.

7. The apparatus of claim 5, further comprising:
   a filter disposed between the optical collimator and the transmittance sensor.

8. The apparatus of claim 2, wherein the lamp assembly provides the infrared light at a wavelength between about 400 nm and about 14000 nm.

9. The apparatus of claim 1, wherein the load lock chamber is coupled to a processing chamber.

10. The apparatus of claim 1 further comprising:
    a controller configured to determine a temperature of the substrate utilizing a change in transmittance determined from the metric of transmittance detected by the sensor.

11. A method of measuring a substrate temperature during a thermal process comprising:
    heating a substrate disposed in a load lock chamber;
    directing a signal from a signal generator to the substrate;
    detecting a change in transmittance of the signal generated by the signal generator transmitting through the substrate while heating; and
    determining a temperature of the substrate based on the change in transmittance.

12. The method of claim 11, wherein the step of heating the substrate further comprises:
    heating the substrate on a heated robot blade.

13. The method of claim 11, wherein the step of heating the substrate further comprises:
    heating the substrate under a vacuum environment.

14. The method of claim 11, wherein the step of heating the substrate further comprises:
    providing a constant amount of energy to the substrate during detecting.

15. The method of claim 11, wherein the step of detecting the change in transmittance further comprises:
    passing light transmitting through the substrate through an optical collimator to a sensor.

16. The method of claim 11, wherein the step of heating the substrate further comprises:
    heating the substrate by light, a portion of which is used to measure the change in transmittance.

17. The method of claim 11, wherein the step of detecting the change in transmittance further comprises:
    sensing infrared light passing through the substrate having a wavelength band of about 10 nm centered at about 1200 nm.

18. The method of claim 11, further comprising:
    treating the substrate by a halogen containing element prior to heating the substrate.

19. A method for measuring a substrate temperature during a thermal process, comprising:
    treating a substrate processed in a presence of a halogen containing element;
    transferring the substrate onto a pedestal disposed in an evacuable load lock chamber having a lamp assembly;
    heating the substrate with an infrared light provided by the lamp assembly;
    detecting a portion of the infrared light transmitting through the substrate; and
    calculating a substrate temperature based on the detected transmitted light.

20. The method of claim 19, wherein the step of detecting infrared light further comprises:
    directing the transmitted light through an optical conduit to a sensor.

21. The method of claim 19, further comprising:
    removing the halogen containing element from the substrate surface while heating.

22. The method of claim 19, wherein the step of detecting infrared light further comprises:
    sensing infrared light passing through the substrate having a wavelength band of about 10 nm centered at about 1200 nm.

23. The method of claim 19, wherein the evacutable load lock chamber is a load lock chamber disposed in a processing system.

* * * * *

UNITED STATES PATENT AND TRADEMARK OFFICE
CERTIFICATE OF CORRECTION

| | | |
|---|---|---|
| PATENT NO. | : 7,946,759 B2 | |
| APPLICATION NO. | : 11/676092 | |
| DATED | : May 24, 2011 | |
| INVENTOR(S) | : Davis et al. | |

It is certified that error appears in the above-identified patent and that said Letters Patent is hereby corrected as shown below:

Column 9, Line 42, please delete "JR" and insert --IR-- therefor.

Signed and Sealed this
Sixth Day of September, 2011

David J. Kappos
*Director of the United States Patent and Trademark Office*